United States Patent [19]

Rourke et al.

[11] Patent Number: 4,816,233

[45] Date of Patent: Mar. 28, 1989

[54] ION EXCHANGE METHOD FOR THE RECOVERY OF SCANDIUM

[75] Inventors: William J. Rourke, Worcester; Wen-Chao Lai, Westboro; Samuel Natansohn, Sharon, all of Mass.

[73] Assignee: GTE Laboratories Incorporated, Waltham, Mass.

[21] Appl. No.: 95,367

[22] Filed: Sep. 11, 1987

[51] Int. Cl.$^4$ .............................................. C01G 17/00
[52] U.S. Cl. .................................. 423/21.5; 423/263; 423/DIG. 14; 210/672; 210/685; 210/688; 75/101 R; 75/101 BE; 75/121
[58] Field of Search ............. 423/21.5, 263, DIG. 14; 210/672, 685, 688; 75/101 R, 101 BE, 121

[56] References Cited

U.S. PATENT DOCUMENTS

| | | | |
|---|---|---|---|
| 2,874,039 | 2/1959 | Pruvot et al. | 75/84.5 |
| 3,013,859 | 12/1961 | Kuhlman, Jr. et al. | 23/22 |
| 4,624,703 | 11/1986 | Vanderpool et al. | 75/101 |
| 4,626,280 | 12/1986 | Vanderpool et al. | 75/101 |
| 4,718,995 | 1/1988 | Vanderpool et al. | 423/21.5 |
| 4,718,996 | 1/1988 | Vanderpool et al. | 423/263 |
| 4,751,061 | 6/1988 | Kim et al. | 423/21.5 |
| 4,765,909 | 8/1988 | Rourke et al. | 423/21.5 |

Primary Examiner—Robert L. Stoll
Attorney, Agent, or Firm—Ivan L. Ericson

[57] ABSTRACT

A method of recovering quantitatively trace amounts of scandium from aqueous solutions containing large amounts of other metals consists of reducing any manganese and iron in the solution to the divalent states of manganese and iron. The solution is then adjusted to a pH from about 1.9 to about 2.1 and passed through a column of the ion exchange resin in the hydrogen form having an iminodiacetic acid functionality. The scandium is absorbed on the column and any base metals and rare earth metals which were also absorbed are removed by eluting with a dilute acid without removing the scandium. The scandium is subsequently removed from the column by eluting with a solution containing a chelating agent such as diglycolic acid. The scandium is then recovered from the solution by precipitation, filtering, washing, drying and calcined to the oxide.

25 Claims, No Drawings

ION EXCHANGE METHOD FOR THE RECOVERY OF SCANDIUM

FIELD OF THE INVENTION

This invention relates to a method of recovering scandium. More particularly, this invention relates to an ion exchange method of recovering scandium selectively in the presence of a large excess of other ions.

BACKGROUND OF THE INVENTION

Scandium, in spite of its relative abundance in the earth's crust and attractive properties, is not a commonly used element, partly because there are no convenient (high grade) sources or ores of the metal. Important low grade sources include uranium tailings and the waste sludges of tungsten recovery plants. These sludges consist largely of iron and manganese and other hydrous oxides and contain varying levels of scandium, typically in concentrations of 100-1000 ppm.

Processes which attempt to recovery scandium from such a material face the problem that the waste is extremely complex and heterogeneous chemically. About two dozen other elements are present in greater or lesser amounts. Furthermore, the low level of scandium necessitates the processing of large quantities of material. Consequently, to be economical a recovery scheme must be simple and selective. Ideally, the process should be operable on a continuous as opposed to a batch basis.

Procedures for the separation of scandium from iron and other metals disclosed in issued U.S. patents have disadvantages which make them ill-suited for the large scale production. For instance, U.S. Pat. No. 3,013,859 discloses an extraction based procedure requiring that an aqueous phase be brought to a concentration of 2.5 lbs/gal magnesium nitrate before equilibration with an alkyl phosphate extractant occurs. On a large scale such a procedure would be expensive because of the amount of magnesium nitrate required to process thousands of gallons of solution. A further complication would be the disposal of recovery of this magnesium nitrate.

Another procedure is disclosed in U.S. Pat. No. 2,874,039 which achieves the separation of scandium from iron and other metals by volatilization of the chlorides in a furnace at about 1000° C. Not only would such a procedure be high in energy consumption and low in throughput, it suffers from the further disadvantage that it cannot be operated as a continuous process and it is encironmentally objectionable.

The prevalent approach to the extraction of metal ions from solution by ion exchange resins is the use of strong cation type resins. This technique is useless for the recovery of a small amount of an ion such as scandium in the presence of a large excess of other ions because strong cationic resins adsorb all metallic ions so that the resin becomes quickly saturated and no selectivity is obtained.

In a recent presentation at the 17th Rare Earth Research Conference, McMaster University, Hamilton, Ont., June 9-12, 1986, L. A. Herchenroeder et al., describe the use of a strong cation exchange resin for the purification of scandium oxide. In this application, scandium oxide of 98% purity is dissolved and passed through an ion exchange column packed with a resin of a strong cation type on which all the cations present in solution are adsorbed. The separation of scandium from the other ions is obtained by ion exchange chromatography in which the adsorbed ions are eluted by a reagent which differentiates between different size ions and the eluate is passed repeatedly through twelve ion exchange columns to obtain a scandium band. This takes weeks, if not months, and is done at the impractical high temperature of 96° C. which requires the columns to be placed in a special hot box.

It is, therefore, the purpose of this invention to provide a method for the recovery of scandium from solution using cation exchange resin of the weakly acidic type.

Another object of this invention is to provide a method for the selective adsorption and recovery of trace amounts of scandium in the presence of a large excess of other ions.

Still another object of this invention is to provide a method for the recovery of scandium at room temperature and in a short period of time.

Yet another purpose of this invention is to provide a method for the recovery of scanadium which is cost effective in that it can be made continuous, it is readily adaptable to industrial implementation and is using standard, available reagents.

SUMMARY OF THE INVENTION

In accordance with one aspect of the present invention, a new and improved method of recovering scandium values from a tungsten ore residue comprises the following steps:

Step 1

Scandium contained in a tungsten ore residue comprising iron, manganese, and scandium is dissolved with an acid solution containing a reducing agent and any dissolved tetravalent manganese is converted to divalent manganese by the reducing agent forming an acid solution comprising said scandium, iron, and divalent manganese.

Step 2

Any trivalent iron present in the acid solution comprising the scandium, iron, and divalent manganese from step 1 is converted to divalent iron by the addition of an iron reducing agent forming a trivalent iron free acid solution comprising the scandium, divalent iron, and divalent manganese.

Step 3

The trivalent iron free solution comprising the scandium, divalent iron, and divalent manganese from step 2 is adjusted to a pH from about 1.9 to about 2.1 to form a pH adjusted solution comprising the scandium, divalent iron, and divalent manganese.

Step 4

The scandium contained in the pH adjusted solution comprising the scandium, divalent iron, and divalent manganese from step 3 is removed from the pH adjusted solution comprising the scandium, divalent iron, and divalent manganese by contacting the pH adjusted solution comprising the scandium, divalent iron, and divalent manganese with an ion exchange resin being in a hydrogen form and having an iminodiacetic acid functionality forming an ion exchange resin having the scandium absorbed thereon.

Step 5

The ion exchange resin having the scandium absorbed thereon from step 4 is rinsed with a dilute acid to remove any base metals and rare earth metals absorbed on the ion exchange resin without removing the scandium absorbed thereon.

Step 6

The scandium absorbed on the ion exchange resin is eluted from the ion exchange resin with a solution comprising a chelating agent to form an elution solution comprising the scandium and the chelating agent.

Step 7

The scandium from the elution solution comprising the scandium is precipitated by adding a precipitating agent to form a scandium precipitate in the elution solution.

Step 8

The scandium precipitate is separated from the elution solution.

In accordance with another aspect of the present invention, a new and improved method of recovering scandium from an aqueous solution comprising scandium, iron, and manganese comprises the following steps:

Step 1

An acid and a reducing agent are added to an aqueous solution comprising scandium, iron, and manganese and any tetravalent manganese is converted to divalent manganese by the reducing agent forming an acid solution comprising the scandium, iron, and divalent manganese.

Step 2

Any trivalent iron present in the acid solution comprising the scandium, iron, and divalent manganese from step 1 is converted to divalent iron by the addition of an iron reducing agent forming a trivalent iron free acid solution comprising the scandium, divalent iron, and divalent manganese.

Step 3

The trivalent iron free solution comprising the scandium, divalent iron, and divalent manganese from step 2 is adjusted to a pH from about 1.9 to about 2.1 to form a pH adjusted solution comprising the scandium, divalent iron, and divalent manganese.

Step 4

The scandium contained in the pH adjusted solution comprising the scandium, divalent iron, and divalent manganese from step 3 is removed by contacting the pH adjusted solution comprising the scandium, divalent iron, and divalent manganese with an ion exchange resin being in a hydrogen form and having an iminodiacetic acid functionality forming an ion exchange resin having the scandium absorbed thereon.

Step 5

The ion exchange resin having the scandium absorbed thereon from step 4 is rinsed with a dilute acid to remove any base metals and rare earth metals absorbed on the ion exchange resin without removing the scandium absorbed thereon.

Step 6

The scandium absorbed on the ion exchange resin is eluted from the ion exchange resin with a solution comprising a chelating agent to form an elution solution comprising the scandium and the chelating agent.

Step 7

The scandium from the elution solution comprising the scandium is precipitated by adding a precipitating agent to form a scandium precipitate in the elution solution.

Step 8

The scandium precipitate is separated from the elution solution.

In accordance with still another aspect of the present invention, a new and improved method of recovering scandium from an aqueous solution comprising scandium, iron, and manganese comprises the following steps:

Step 1

An acid and a reducing agent are added to an aqueous solution comprising scandium, iron, and manganese and any tetravalent manganese is converted to divalent manganese by the reducing agent forming an acid solution comprising the scandium, iron, and divalent manganese.

Step 2

Any trivalent iron present in the acid solution comprising the scandium, iron, and divalent manganese from step 1 is converted to divalent iron by the addition of an iron reducing agent forming a trivalent iron free acid solution comprising the scandium, divalent iron, and divalent manganese.

Step 3

The trivalent iron free solution comprising the scandium, divalent iron, and divalent manganese from step 2 is adjusted to a pH from about 1.9 to about 2.1 to form a pH adjusted solution comprising the scandium, divalent iron, and divalent manganese.

Step 4

The scandium contained in the pH adjusted solution comprising the scandium, divalent iron, and divalent manganese from step 3 is removed by contacting the pH adjusted solution comprising the scandium, divalent iron, and divalent manganese with an ion exchange resin being in a hydrogen form and having an iminodiacetic acid functionality forming an ion exchange resin having the scandium absorbed thereon.

Step 5

The ion exchange resin having the scandium absorbed thereon from step 4 is rinsed with a dilute acid to remove any base metals and rare earth metals absorbed on the ion exchange resin without removing the scandium absorbed thereon.

Step 6

The scandium absorbed on the ion exchange resin is eluted from the ion exchange resin with a solution comprising a chelating agent to form an elution solution comprising the scandium and the chelating agent.

Step 7

The scandium from the elution solution comprising the scandium and the chelating agent is removed by contacting the elution solution comprising the scandium and the chelating agent with a strong cation ion exchange resin being in a hydrogen to form a strong cation ion exchange resin having the scandium absorbed thereon.

Step 8

The scandium absorbed on the strong cation exchange resin from step 7 is eluted with a strong acid to form a second acid solution comprising the scandium.

Step 9

The scandium from said second acid solution comprising the scandium is precipitated by adding a precipitating agent to the second acid solution to form a scandium precipitate in the second acid solution.

Step 10

The scandium precipitate is separated from the second acid solution.

Additional objects of this invention will become apparent from the detailed description of the invention given below.

DETAILED DESCRIPTION OF THE INVENTION

This invention addresses the problem of the recovery of valuable metals from low level or secondary sources. Specifically, it is concerned with a process for recovering scandium by dissolution and ion-exchange from a matrix of iron, manganese and other hydrous oxides such as are present in the processing waste of wolframite ore.

The process is an ion-exchange method, an attractive unit operation from an engineering standpoint since a bank of two or more ion-exchange columns can process a feed stream. Furthermore, the selective nature of the proposed procedure minimizes the addition of chemical reagents to the solution before the ion-exchange step.

The process is also designed to operate at room temperature which makes it both convenient and cost effective.

An illustrative and useful, but not sole implementation of this invention is the recovery of scandium from the wolframite waste sludge of a tungsten processing plant. Such sludges consist of oxides or hydrous oxides of many metals, with those of iron and manganese being the most abundant ones, and also contain scandium in concentrations in the 100–1000 ppm range. The typical composition of such sludge is given below in terms of its metal content:

TABLE I

| Composition of Wolframite Ore Sludge (w/o) | |
| --- | --- |
| Fe | 22 |
| Mn | 20 |
| W | 4.3 |
| Si | 3.2 |
| Sn | 0.96 |
| Na | 0.84 |
| Ca | 0.75 |
| Sc | 0.05 |

Many other elements are also present in concentrations below 0.5 w/o.

In order to separate and recover the trace amount of scandium from the wolframite processing waste, it is necessary to bring it into a soluble form so as to make it amenable to selective extraction techniques. A substantial part of the surrounding matrix is dissolved in the process. The criteria governing the dissolution which are essential to the subsequent scandium recovery are as follows:

1. Maximization of the amount of scandium dissolved while minimizing the matrix dissolution; the latter so as to have the least possible concentration of and, therefore, possible interference from extraneous ions in the scandium recovery. A consideration is also in using standard, inexpensive reagents and using mild reaction conditions such as ambient temperature and pressure. In practice, in order to bring 90% to 95% of the scandium into solution, it is necessary to dissolve about 70% of the matrix. This dissolves virtually all of the manganese and about half of the iron present in the matrix.

2. If tetravalent manganese is present in the system, as is the case with this material, it is necessary to reduce it to the divalent state so as to render it soluble in mineral acids, the most effective and least expensive reagent for this purpose. Reducing agents found to be effective for this purpose are hydrazine, hydrogen peroxide, hydroxylamine, oxalic acid, hydrochloric acid, formaldehyde, etc, but other reductants may be equally suitable.

3. It is necessary to assure that no trivalent (ferric) iron is present in the solution because the similarity in chemical reactivity of $Fe^{3+}$ and $Sc^{3+}$ makes the separation of the two metals by chemical means very difficult. Because the chemical behavior of divalent (ferrous) iron is sufficiently different so as to permit complete and effective chemical separation of scandium from even a large excess of divalent iron, an effective way of eliminating $Fe^{3+}$ is its reduction to $Fe^{2+}$. This is done conveniently with elemental iron according to the equation $$Fe^0 + 2Fe^{3+} \rightarrow 3Fe^{2+} \qquad (Eq. 1)$$

Alternately, most of the trivalent iron may be removed from the process stream by the precipitation of goethite, $-FeOOH$, which is effective at pH values above 2.

4. For optimum scandium selectivity and recovery, it is necessary to maintain the pH of the process stream in the range of 1.9–2.1, preferably at 2.0, during extraction. At lower pH values, the scandium will not be retained on the column effectively and at higher pH values, the other ions will also be retained on the column affecting adversely the selectivity of the ion exchange resin for scandium.

NOTE: The process of this invention is applicable to the separation and recovery of scandium from any system in which it is found in the presence of other, acid soluble materials. The considerations discussed under 2 and 3 above are only valid if $Mn^{4+}$ or $Fe^{3+}$, respectively, are present in the system, as is the case in the material under discussion.

A sample of the wolframite ore residue is treated with dilute mineral acid such as sulfuric acid in the presence of an appropriate reductant, i.e. hydrazine hydrate to bring 90–95% of the scandium into solution. Other acids are also effective and, at times, preferred. The resulting slurry is filtered with the filtrate containing the scandium values, virtually all the manganese and about half the iron content. The residue contains the tungsten, silicon, rest of the iron and other acid insoluble materials but very little scandium. Any $Fe^{3+}$ present in the filtrate is reduced with finely divided metallic iron powder. The absence of $Fe^{3+}$ is confirmed by a sensitive colorimetric spot test using potassium thiocyanate solution.

The pH of the scandium containing solution is adjusted to a value of 2.0 and the solution is passed through an ion exchange column made from a resin with an iminodiacetic acid functionality. There are many manufacturers of this type of resin but the one used in the process of this invention is Amberlite IRC-718 manufactured by Rohm and Haas Co., Philadelphia, PA 19105, and distributed locally, by Alfa Products, Danvers, MA 01923. It is interesting to note that the catalog of this vendor designates the IRC-718 resin as "useful for removing transition metals", an effect completely opposite of that sought in this process. The object of this invention is to selectively retain scandium on the column while letting the vast excess of transition metals such as manganese and iron pass through the column unadsorbed. This was achieved unexpectedly and successfully, as will be demonstrated by the examples below, by the careful and judicious exploitation of the subtle differences in the chemical behavior between the scandium ions and manganese as well as iron ions, namely by selecting the appropriate pH operating range and by assuring the absence of $Fe^{3+}$ in the solution.

The ion exchange resin, which is sold in the sodium form, is converted to the hydrogen form by passing dilute sulfuric acid through the column. Then, the scandium-containing solution is passed through the column at a rate of about 0.03 bed volumes (BV)/min=1.8 BV/hr. Flow rates of up to 5 BV/hr are equally effective. The scandium is adsorbed on the ion exchange resin virtually quantitatively, in excess of 99.5%. On the other hand, the manganese and iron, although present in 100–200 -fold excess, are not retained. This was determined by analyzing samples of the column feed solution and the column effluent for these three metals. The concentration of the manganese and iron in the column effluent was virtually the same as that of the solution entering the column (within the error of the analytical technique which is Direct Current Plasma Atomic Emission Spectrometry, DCP). These results were confirmed by analyzing the acid used to remove tramp metal impurities from the resin. No manganese and only small amounts of iron were found in this eluate. On the other hand, the quantitative retention of scandium on the column was demonstrated by the virtual absence of scandium in the column effluent solution until the ion exchange capacity of the resin was being approached.

In order to maximize scandium recovery the flow of the feed solution through the column is discontinued when measurable amounts of scandium begin to appear in the column effluent, typically when the scandium retention efficiency is reduced to 90%. The column is then washed with dilute acid to remove any weakly absorbed materials as well as metallic impurities and the remnants of the feed solution contained in the interstitial spaces of the resin. The scandium is then eluted quantitatively from the ion exchange resin by a dilute solution of diglycolic acid in water. The diglycolic acid is a chelating agent that has a higher stability constant for scandium complexation than the iminodiacetate ligand of the resin and also higher than other adsorbed ions of similar chemical reactivity, such as thorium, at the particular pH of the elution. The scandium is thus eluted preferentially and completely. In the process, a purification step occurs because the other materials retained on the column are not eluted along with the scandium. Based on the same principles, other complexing agents such as carboxylic and hydroxy acids, EDTA, may be equally effective in the preferential elution of scandium from the ion exchange resin.

The scandium-values may be directly recovered from the eluate by addition of ammonium hydroxide and consequent precipitation of scandium hydroxide at pH above 7. The precipitate is filtered, washed and then calcined to decompose it to the oxide.

An alternate route which provides a purer material is the precipitation of the scandium as the oxalate. It results in a purer scandium product because many of the metals which co-precipitate as the hydroxides with the scandium do not precipitate as oxalates. However, the direct precipitation of the scandium as the oxalate is inhibited in the diglycolic acid eluate because the scandium is complexed with the diglycolate ligand. It is, therefore, necessary to separate the scandium from this solution which is readily done by passing it through a column made of a strong cation ion exchange resin in the hydrogen form for example, Amberlite IR-118 resin made by Rohm and Haas Company, Philadelphia, PA 19105 and distributed locally by Alfa Products, Danvers, MA 01923. Other resins of this type are equally effective for this purpose. As the scandium-containing diglycolic acid solution is passed through the column, the scandium is quantitatively absorbed on the ion exchange resin and the replaced $H^+$ ions protonate the diglycolate anions effectively so that the column effluent is a regenerated diglycolic acid solution which can be used again in eluting a scandium loaded extraction column. Experiments have established the recyclability of the diglycolic acid, demonstrating the cost effectiveness of the process, the minimal use of the reagents and the capability of operating in a closed loop.

The scandium retained on the strong cationic resin is eluted quantitatively with 6N HCl. The scandium values are then precipitated by the addition of saturated oxalic acid. The precipitate is filtered, washed and converted to a high purity $Sc_2O_3$ by calcining at elevated temperatures. The ion exchange resin is regenerated during the elution step with 6N HCl and can be used repeatedly at undiminished capacity in this cycle.

The Amberlite IRC-718 ion exchange resin used for the selective retention of scandium from the process stream is also regenerated following the scandium elution. The column is first washed with a dilute acid solution to remove metals retained on the resin, then it is treated with an alkaline solution to rinse off the ions suitable at high pH and finally it is equilibrated with a strong acid solution to remove strongly held residues of transition and other metals. The column treated in this fashion can be used in many cycles; its extraction efficiency is identical to that of one made from fresh resin.

The implementation of this invention is demonstrated by the examples below. These examples are not to be viewed as limiting the scope of the invention but are merely illustrative of its features.

EXAMPLE I

A 500 gram sample of wolframite ore residue was treated with 10 liters of reducing acid which consisted of 75 ml hydrazine hydrate in 0.625N sulfuric acid. After overnight digestion at room temperature, the slurry was filtered and there was obtained a residue of 151.2 grams and 9 liters of filtrate. The residue was dissolved in 6N HCl and found to contain 0.376 mg of scandium per gram of residue for a total content of 56.8 mg of scandium left in the residue. The filtrate was analyzed to contain 28.8 ppm of scandium or 28.8 mg of scandium per liter. The total amount of scandium in the filtrate was thus 259.2 mg so that 82% of the scandium present in the wolframite ore residue was brought into solution by this treatment. The filtrate was also analyzed to contain 4980±75 ppm of iron and 8000±175 ppm of manganese. Thus, the ratio of iron to scandium in the solution was 173:1 and that of manganese to scandium 278:1, both of these materials being present in large excess as compared to scandium.

The ferric ion content of this solution was minimal as indictated by the fact that it required less than 1 gram of iron powder to reduce it to ferrous state as determined by the colorimetric thiocyanate spot test. After adjusting the pH of the solution to a value of 2.0, the feed solution was passed through an ion exchange column of Amberlite IRC-718 to extract the scandium. This ion exchange resin has an iminodiacetic functionality; when fresh, it needs to be converted to the hydrogen form by being washed with dilute acids. In this example, the resin was used in its seventh cycle and no acid treatment was required because the elution and regeneration steps between extraction cycles involve the use of acids.

The bed volume (BV) of the ion exchange column was 130 cm$^3$ with a cross-section area of 7.8 cm$^2$. The feed solution was passed through the column at a rate of 3.6 ml/min or 0.028 BV/min. The column effluent was collected in fractions of definite volume and the scandium content determined in each fraction to monitor the efficiency of the scandium extraction from the feed solution. The results are summarized in Table II.

TABLE II

Efficiency of Sc Retention on Ion Exchange Column

| Effluent Fraction No. | Fraction Volume (ml) | Cumulative (ml) | Feed Volume (BV) | Sc Concentration in Fraction (ppm) | Sc-Retention Efficiency* (%) |
|---|---|---|---|---|---|
| 1 | 1000 | 1000 | 7.7 | 0 | 100 |
| 2 | 3100 | 4100 | 31.5 | 0.22 | 99.2 |
| 3 | 1000 | 5100 | 39.2 | 0.88 | 96.9 |
| 4 | 50 | 5150 | 39.6 | 1.58 | 94.5 |
| 5 | 50 | 5200 | 40.0 | 1.61 | 94.4 |
| 6 | 50 | 5250 | 40.4 | 1.66 | 94.2 |
| 7 | 50 | 5300 | 40.8 | 1.82 | 93.7 |
| 8 | 50 | 5350 | 41.2 | 2.02 | 93.0 |
| 9 | 50 | 5400 | 41.5 | 2.15 | 92.5 |
| 10 | 50 | 5450 | 41.9 | 2.29 | 92.0 |
| 11 | 50 | 5500 | 42.3 | 2.43 | 91.6 |
| 12 | 1000 | 6500 | 50.0 | 4.83 | 83.2 |
| 13 | 100 | 6600 | 50.8 | 7.23 | 74.9 |
| 14 | 100 | 6700 | 51.5 | 7.94 | 72.4 |
| 15 | 100 | 6800 | 52.3 | 8.39 | 70.9 |

*Based on Sc concentration in feed solution of 28.8 ppm.

The data show that a scandium retention efficiency in excess of 90% is maintained as over 42 BV (approx. 5500 ml) of feed solution were passed through the column. The extraction was stopped after 6800 ml of solution were processed because the retention efficiency was decreasing rapidly. The calculated amount of scandium retained on the column was 186.3 mg out of the maximum possible of 195.8 mg indicating an overall scandium retention efficiency of 95.1%.

The selectivity of this ion exchange resin for scandium in the process is demonstrated by the data in Table III which give the concentration of iron, manganese and scandium in the column feed and effluent solutions. Fraction No. 3 was selected for the latter data because at this point about ¾ of the total volume have been passed through the column so that the sample is quite representative of the process.

TABLE III

Concentration of Iron, Manganese and Scandium in Feed and Effluent Solutions

| | [Fe] (ppm) | [Mn] (ppm) | [Sc] (ppm) |
|---|---|---|---|
| Column Feed Solution | 4890 ± 75 | 8000 ± 175 | 28.8 |
| Column Effluent Solution (Fraction No. 3) | 4800 ± 110 | 7800 ± 146 | 0.88 |

These data show that, within the error of the measurement, the concentration of the iron and manganese is the same in both the column feed and effluent solutions and, therefore, there is no retention of these metals on the ion exchange column. Furthermore, in spite of the large excess of these metals in the feed solution, the scandium is retained selectively and virtually quantitatively demonstrating the selectivity of the process.

After completion of the extraction step, the column was washed with 1200 ml of a dilute solution of $H_2SO_4$ having a pH of about 1.9 to about 2.1, preferably about 2.0 to remove remnants of the feed solution. Next, the column was eluted with 1400 ml (10 BV) of a 0.05M diglycolic acid solution at a flow rate of 3.6 ml/min.

The total amount of scandium found in this eluate solution was 187.1 mg, indicating that the elution was quantitative within the error of the measurement.

The scandium containing diglycolic acid solution was then passed through a column made from a strong cation exchange resin in the hydrogen form, i.e., Amberlite IR-118, at a flow rate of 2.6 ml/min. In the process, all of the scandium was retained on the resin bed as indicated by the absence of scandium (less than 0.05 ppm) in the column effluent. The diglycolic acid was protonated in its passage through the column exchanging its $Sc^{3+}$ for $H^+$ ions, and was ready for another eluting application.

The scandium retaining resin bed was then washed with 100 ml of deionized water and then eluted with 600 ml of 6N HCl at a flow rate of 2.7 ml/min. The total amount of scandium found in this eluate was 187.5 mg, identical (within error of measurement) to the amount found in the diglycolic acid eluate. This demonstrates that the stripping of the scandium from the diglycolic acid by the strong cation exchange resin is quantitative as is the elution of scandium from the resin bed by 6N HCl.

The pH of the scandium containing solution was increased by dropwise addition of $NH_4OH$ and then a saturated solution of oxalic acid was added dropwise to precipitate scandium oxalate. After digestion, the precipitate was filtered, washed, and the filtrate analyzed for scandium. The total amount of scandium found in the filtrate was 1.7 mg indicating a precipitation efficiency of over 99%. The scandium oxalate precipitate was then converted to the oxide by heating it in a Pt crucible at an orange heat to a constant weight. The weight of the resulting $Sc_2O_3$ product is in excellent agreement with that predicted from the scandium content of the solution. Thus, 291.1 mg of the $Sc_2O_3$ were recovered in this example, somewhat higher, but within the error of measurement, than the 287.6 mg calculated from the amount found in the solution prior to precipitation.

The purity of the resulting $Sc_2O_3$ was about 95%. The impurities found in the resulting $Sc_2O_3$ are listed in Table IV.

The sum of all the other impurities detected totaled 0.62 w/o, with none of them exceeding 0.1 w/o. It is particularly noteworthy that the iron and manganese, which constituted 22 and 20 w/o, respectively, of the original starting material (Table I), constitute only 0.077 w/o and 0.044 w/o, respectively, of the recovered $Sc_2O_3$.

TABLE IV

| Impurities in $Sc_2O_3$ product (w/o) | |
|---|---|
| Ce | 1.4 |
| Th | 1.0 |
| Pb | 0.85 |
| Nd | 0.53 |
| La | 0.27 |
| Pr | 0.17 |
| Gd | 0.16 |
| Ca | 0.16 |
| Fe | 0.077 |
| Mn | 0.044 |
| Remaining Impurities | 0.62 |

Under the conditions of this invention, the scandium recovery process is extremely efficient in that 99% of the scandium retained on the initial extraction column is recovered in the form of oxide. The column elution step is 100% efficient, as is the retention of the scandium on the strong cation resin and the elution of scandium from that resin. The oxalate precipitation is 99% efficient. The overall recovery of the scandium present in the feed solution is determined solely by the point at which the extraction experiment is stopped. In this example, the flow through the column was stopped at the point where 95% of the scandium was retained on the column, thus, realizing an overall scandium recovery of 94%, an excellent value. Had the extraction been stopped sooner, a correspondingly higher overall scandium recovery would have been achieved.

EXAMPLE II

The effect of the amount of reductant, in this case hydrazine hydrate, on the dissolution of the wolframite ore residue was demonstrated in this example. Six 10 g samples were each slurried with 225 ml of 0.75N sulfuric acid and hydrazine hydrate solution was added to each of the samples in increasing amounts. The dissolution reactions were allowed to proceed for 24 hours at room temperature with occasional stirring. At the end of this reaction period, the reaction slurries were heated to 60° C. for a brief period of time to assure completeness of the reaction and were then filtered. The undissolved fractions were dried and weighed to obtain the amount of material dissolved. The data are summarized in Table V.

TABLE V

Dissolution of Wolframite Ore Residue

| Reaction No. | Hydrazine 20% $N_2H_4H_2O$ Sol. (ml) | Added $N_2H_4$ (moles) | Weight Undissolved Material (g) | Ore Residue Dissolved (%) |
|---|---|---|---|---|
| 1 | 2.0 | 0.0082 | 6.43 | 35.7 |
| 2 | 4.0 | 0.0165 | 5.96 | 40.4 |
| 3 | 6.0 | 0.0247 | 5.53 | 44.7 |
| 4 | 8.0 | 0.0330 | 4.98 | 50.2 |
| 5 | 10.0 | 0.0412 | 4.43 | 55.7 |
| 6 | 12.0 | 0.0495 | 4.41 | 55.9 |

The data indicate that the dissolution is essentially complete after addition of 0.0412 moles of hydrazine. The iron, manganese and scandium content in both the filtrate and the undissolved fraction were determined, in the latter material by dissolving it in 6N HCl. The results are given in Table VI.

TABLE VI

Dissolution of Wolframite Ore Residue Components

| Reaction No. | 1 | 2 | 3 | 4 | 5 |
|---|---|---|---|---|---|
| Dissolved Fe (mg) | 829 | 842 | 713 | 775 | 967 |
| Undissolved Fe (mg) | 1,373 | 1,342 | 1,436 | 1,422 | 1,219 |
| Total Fe (mg) | 2,202 | 2,184 | 2,149 | 2,197 | 2,186 |
| % Fe Dissolved | 37.6 | 38.3 | 33.2 | 35.3 | 44.2 |
| Dissolved Mn (mg) | 888 | 1,154 | 1,483 | 2,008 | 1,992 |
| Undissolved Mn (mg) | 1,181 | 878 | 808 | 173 | 92 |
| Total Mn (mg) | 2,069 | 2,032 | 2,291 | 2,181 | 2,084 |
| % Mn Dissolved | 42.9 | 56.8 | 64.7 | 92.1 | 95.6 |
| Dissolved Sc (mg) | 5.675 | 7.538 | 8.775 | 11.300 | 11.250 |
| Undissolved Sc (mg) | 5.874 | 4.473 | 2.653 | 0.242 | 0.149 |
| Total Sc (mg) | 11.549 | 12.011 | 11.428 | 11.541 | 11.399 |
| % Sc Dissolved | 49.1 | 62.8 | 76.7 | 97.9 | 98.7 |

The data shows that under these experimental conditions it is possible to dissolve 98% of the scandium values and 95% of the manganese values while dissolving less than half of the iron content. Thus, the valuable components are preferentially brought into solution from where they can be effectively recovered while most of the iron remains undissolved.

EXAMPLE III

A 100 g sample of wolframite ore residue was treated with a reagent consisting of 16 ml of hydrazine hydrate, $H_2NNH_2.H_2O$, added to 200 ml of 0.75N $H_2SO_4$. The ore residue was digested in this solution for about 24 hours at room temperature to bring the scandium values into solution; shorter digestion times are possible if the slurry is heated. The slurry was filtered to separate the insoluble residue. The filtrate was analyzed and shown in Table VII to contain:

TABLE VII

Total Fe: 4780 ppm
$Fe^{3+}$: 1490 ppm
Mn: 8600 ppm
Sc: 35.3 ppm

The pH of the solution was 2.03 which is in the appropriate range for the selective extraction of scandium by the ion exchange resin of this invention.

1.5 g of finely divided iron powder were added to this solution to reduce the trivalent to divalent iron, according to the reaction given in Equation 1. This was accomplished effectively as indicated by the colorimetric spot test for $Fe^{3+}$. The solution was filtered to remove any undissolved iron powder particulates and passed through the ion exchange column. Although the total iron concentration of this solution was now increased to 5530 ppm, it had no adverse effect on the selective retention of scandium which was quantitative. This ore dissolution technique has the advantages that only one-third of the total iron is present in the objectionable trivalent state which needs treatment and that the pH of the solution has the optimum value for scandium extraction, thus requiring no pH adjustments.

EXAMPLE IV

A 100 g sample of wolframite ore residue was reacted with a solution containing 16 ml of hydrazine hydrate added to 2000 ml of 0.75N sulfuric acid. After digestion at room temperature for 24 hours to dissolve the scandium-values, the pH of the slurry was adjusted to a value of 3 and the slurry was heated at 90° C. for about 3 hours. This causes the precipitation of trivalent iron as geoethite, FeOOH, and thus reduces the undesirable $Fe^{3+}$ content of the process stream. After this treatment, the slurry was filtered and the solution analyzed to contain the following amounts of the principal components:

TABLE VIII

Total Fe: 4930 ppm
$Fe^{3+}$: 100 ppm
Mn: 8450 ppm
Sc: 50 ppm

The data indicate that the geothite precipitation is very effective in that only 2% of the total iron content is in the trivalent state. This requires a minor correction of adding only 0.1 g of iron powder to completely reduce the iron to the divalent state, thus making the solution suitable for scandium extraction. The goethite precipitation can, of course, be done after filtering the original slurry, but this example demonstrates both the effectiveness of the method and its efficiency because it combines two filtration procedures into a single process step.

EXAMPLE V

A sample of 100 g of wolframite ore residue was reacted with 2500 ml of a solution comprised of 1.2 v/o hydrogen peroxide in 0.8N $H_2SO_4$ (this solution was made by mixing 2000 ml of 1N $H_2SO_4$ with 500 ml of a 6 v/o $H_2O_2$ solution). The slurry was filtered and the filtrate which had a pH of 1.30, had the following composition:

TABLE IX

Total Fe: 3,080 ppm
$Fe^{3+}$: 2,800 ppm
Mn: 5,640 ppm
Sc: 14 ppm

In this solution virtually all of the iron is in the trivalent state and it requires 3.6 g of fine iron powder to reduce it to the divalent state. In spite of the increase in the total iron concentration to 4520 ppm, the scandium extraction from this solution proceeds quantitatively as shown in Example I.

EXAMPLE VI

A 100 g sample of the wolframite ore residue was reacted with 2500 ml of a reagent consisting of 0.06M hydroxylamine, $NH_2OH$, dissolved in 0.5N $H_2SO_4$. The filtrate from this slurry contained 7070 ppm manganese, 20.1 ppm scandium, and 3570 ppm iron, most of which was in the desirable $Fe^{2+}$ state. The scandium values from this solution can be effectively removed by the ion exchange column, provided that all traces of $Fe^{3+}$ are reduced to $Fe^{2+}$.

EXAMPLE VII

An alternate technique of wolframite ore residue dissolution is the use of hydrochloric acid instead of sulfuric acid in combination with hydrazine. Hydrochloric acid solutions are frequently preferred in chemical processing because they do not lead to objectionable scale build-up in the pipes and conduits such as frequently encountered when sulfuric acid solutions are used. A preparation analogous to that described in Example III was made except that 0.75N HCl was used instead of $H_2SO_4$. A sample of 100 g of wolframite ore residue was treated with 2000 ml of 0.75N HCl containing 16 ml of hydrazine hydrate. The treatment was effective as demonstrated by the analysis of the resulting solution.

TABLE X

Total Fe: 5000 ppm
$Fe^{3+}$: 1010 ppm
Mn: 7980 ppm
Sc: 27.0 ppm
pH: 1.27

This solution, after reduction of the $Fe^{3+}$ to $Fe^{2+}$ and adjusting the pH to a value of 2.0, is a suitable feed from the scandium-extraction column.

NOTE: The analyses of the solutions obtained by the dissolution techniques described in the above Examples show variations in the metal content. This is not an indication of the efficiency of the particular method. Rather, it represents the real variation in the metal concentration of various portions of the wolframite ore residue which, being a waste material, is very inhomogeneous.

EXAMPLE VIII

Hydrochloric acid by itself is a good reducing agent for the reduction of $Mn^{4+}$ to $Mn^{2+}$ and readily dissolves many metallic oxides. Thus, it can be used to dissolve the metal values in the wolframite ore residue. This was shown when 100 g of the ore residue were heated at 70°–80° C. for several hours in 1500 ml of 6N HCl. The filtrate of this slurry was analyzed to contain the following metal concentrations.

TABLE XI

Total Fe: 17,800 ppm
Mn: 14,600 ppm
Sc: 52.9 ppm

These data demonstrate the completeness of the dissolution. However, the disadvantage of this technique is that in the process of $Mn^{4+}$ reduction, chlorine is generated according to the equation:

$$MnO_2 + 4H^+ + 4Cl^- \rightarrow Mn^{2+} + 2Cl^- + Cl_2 + 2H_2O \quad (Eq.\ 2)$$

While the technology for the collection and recovery of the chlorine, a valuable by-product, is industrially available, the presence of this gas in the system imposes special safety and environmental constraints on the processing system and equipment.

EXAMPLE IX

The diglycolic acid solution containing the scandium values eluted from the ion exchange column was treated with hydroxide to precipitate the metal hydroxide. This precipitate was filtered, washed and then ignited to the oxide. Analysis of this product by spark source mass spectrometry indicates the following impurities present:

TABLE XII

Si-3.7 w/o
Fe-0.75 w/o
Th-0.71 w/o
Mn-0.39 w/o
V-0.28 w/o
P-0.23 w/o
Pb-0.23 w/o
Ti-0.13 w/o

All other impurities total 0.23 w/o, with none of them exceeding 0.1 w/o. The purity of the scandium product obtained by this simple procedure was in excess of 93%.

EXAMPLE X

After the scandium values were eluted from the ion exchange resin with the iminodiacetic functionality which was used to extract the scandium selectively from the feed solution, the column was regenerated by the following treatment:

1. The column was washed with about 1 liter (7.7 BV) of 1N $H_2SO_4$ to elute metals retained on the resin. A flow rate of 3.6 ml/min was found convenient but other flow rates were equally effective.
2. Residues of silicates retained on the resin were then removed by treating the column with about 1 liter (7.7 BV) of 1N NaOH. This too was done at a flow rate of 3.6 ml/min, a convenient but not mandatory value.

3. In order to remove traces of the strongly held multivalent metals such as chromium, the column was treated with 6N HCl. After removing all of the NaOH by washing, the resin bed was rinsed thoroughly with 6N HCl and then the column was filled with this acid solution and left standing overnight. Then, the column is drained with the effluent being noticeably green in color and found, upon analysis, to contain chromium as the major constituent. The column was then washed with additional 2-3 BV of acid and then rinsed thoroughly with water. The acid treatment restored the resin to its hydrogen form and the column was ready for the next extraction cycle.

The effectiveness of the ion exchange resin in repeated use was demonstrated by the data in Table XIII which give the scandium retention efficiency of the column as a function of the volume of the feed stream passed through the column in the 5th, 6th and 7th cycle of its operation. The scandium concentration of the feedstream was not identical; therefore, the column saturation would occur at different points of the run.

TABLE XIII

| Cumulative Feedstream Volume (ml) | Scandium Retention Efficiency (%) | | |
|---|---|---|---|
| | Cycle 5 | Cycle 6 | Cycle 7 |
| 500 | 100 | — | — |
| 1000 | 99.8 | — | — |
| 3100 | — | 99.7 | — |
| 3500 | 99.8 | — | — |
| 4100 | 99.8 | 99.3 | 99.2 |
| 5300 | — | 99.5 | 93.7 |

The scandium retention efficiency of over 99%, virtually quantitative, was maintained as about 40 BV of feed solution were passed through the ion exchange column, and high retention efficiencies were obtained even as more solution was processed.

While there has been shown and described what is at present considered the preferred embodiment of the invention, it will be obvious to those skilled in the art that various changes and modifications may be made therein without departing from the scope of the invention as defined by the appended claims.

What is claimed is:

1. A method of recovering scandium values from a tungsten ore residue comprising the following steps:

Step 1 dissolving scandium contained in a tungsten ore residue comprising iron, manganese, and scandium with an acid solution containing a reducing agent to convert any dissolved tetravalent manganese to divalent manganese forming an acid solution comprising said scandium, iron, and divalent manganese;

Step 2 converting any trivalent iron present in said acid solution comprising said scandium, iron, and divalent manganese from step 1 to divalent iron by adding an iron reducing agent forming a trivalent iron free acid solution comprising said scandium, divalent iron, and divalent manganese;

Step 3 adjusting said trivalent iron free solution comprising said scandium, divalent iron, and divalent manganese from step 2 to a pH from about 1.9 to about 2.1 to form a pH adjusted solution comprising said scandium, divalent iron, and divalent manganese;

Step 4 removing said scandium contained in said pH adjusted solution comprising said scandium, divalent iron, and divalent manganese from step 3 by contacting said pH adjusted solution comprising said scandium, divalent iron, and divalent manganese with an ion exchange resin being in a hydrogen form and having an iminodiacetic acid functionality forming an ion exchange resin having said scandium absorbed thereon;

Step 5 rinsing said ion exchange resin having said scandium absorbed thereon from step 4 with a dilute acid having a pH from about 1.9 to about 2.1 to remove any base metals and rare earth metals absorbed on said ion exchange resin without removing said scandium absorbed thereon;

Step 6 eluting said scandium absorbed on said ion exchange resin with a solution comprising a chelating agent to form an elution solution comprising said scandium and said chelating agent;

Step 7 precipitating said scandium from said elution solution comprising said scandium by adding a precipitating agent to said elution solution comprising said scandium to form a scandium precipitate in said elution solution; and Step 8 separating said scandium precipitate from said elution solution.

2. A method in accordance with claim 1 wherein said acid solution comprising a reducing agent in step 1 comprises hydrazine in sulfuric acid.

3. A method in accordance with claim 1 wherein said trivalent iron free acid solution comprising said scandium, divalent iron, and divalent manganese in step 2 has a pH range from about 1.5 to about 1.7.

4. A method in accordance with claim 1 wherein said step 3 comprises adjusting said trivalent iron free acid solution comprising said scandium, divalent iron, and divalent manganese from step 2 with a base to a pH of about 2.0 to form a pH adjusted solution comprising said scandium, divalent iron, and divalent manganese.

5. A method in accordance with claim 1 wherein said dilute acid of step 5 comprises a solution having a pH of about 1.9 to about 2.1.

6. A method in accordance with claim 1 wherein said chelating agent of said solution containing a chelating agent in step 6 is selected from the group consisting of diglycolic acid, carboxylic acid, hydroxy acid, EDTA, and combinations thereof.

7. A method in accordance with claim 1 wherein said chelating agent of said solution containing a chelating agent in step 6 is dyglycolic acid.

8. A method in accordance with claim 1 wherein step 7 comprises precipitating said scandium from said elution solution comprising said scandium with ammonium hydroxide to form a scandium hydroxide precipitate.

9. A method of recovering scandium from an aqueous solution comprising scandium, iron, and manganese comprising the following steps:

Step 1 adding acid and a reducing agent to an aqueous solution comprising scandium, iron, and manganese to convert any tetravalent manganese to divalent manganese forming an acid solution comprising said scandium, iron, and divalent manganese;

Step 2 converting any trivalent iron present in said acid solution comprising said scandium, iron, and divalent manganese from step 1 to divalent iron by adding an iron reducing agent forming a trivalent iron free acid solution comprising said scandium, divalent iron, and divalent manganese;

Step 3 adjusting said trivalent iron free solution comprising said scandium, divalent iron, and divalent manganese from step 2 to a pH from about 1.9 to about 2.1 to form a pH adjusted solution comprising said scandium, divalent iron, and divalent manganese;

Step 4 removing said scandium contained in said pH adjusted solution comprising said scandium, divalent iron, and divalent manganese from step 3 by contacting said pH adjusted solution comprising said scandium, divalent iron, and divalent manganese with an ion exchange resin being in a hydrogen form and having an iminodiacetic acid functionality forming an ion exchange resin having said scandium absorbed thereon;

Step 5 rinsing said ion exchange resin having said scandium absorbed thereon from step 4 with a dilute acid having a pH from about 1.9 to about 2.1 to remove any base metals and rare earth metals absorbed on said ion exchange resin without removing said scandium absorbed thereon;

Step 6 eluting said scandium absorbed on said ion exchange resin with a solution comprising a chelating agent to form an elution solution comprising said scandium and said chelating agent;

Step 7 precipitating said scandium from said elution solution comprising said scandium by adding a precipitating agent to said elution solution comprising said scandium to form a scandium precipitate in said elution solution; and Step 8 separating said scandium precipitate from said elution solution.

10. A method in accordance with claim 9 wherein said acid solution comprising a reducing agent in step 1 comprises hydrazine in sulfuric acid.

11. A method in accordance with claim 9 wherein said trivalent iron free acid solution comprising said scandium, divalent iron, and divalent manganese in step 2 has a pH range from about 1.5 to about 1.7.

12. A method in accordance with claim 9 wherein said step 3 comprises adjusting said trivalent iron free acid solution comprising said scandium, divalent iron, and divalent manganese from step 2 with a base to a pH of about 2.0 to form a pH adjusted solution comprising said scandium, divalent iron, and divalent manganese.

13. A method in accordance with claim 9 wherein said dilute acid of step 5 comprises a solution having a pH of about 1.9 to about 2.1.

14. A method in accordance with claim 9 wherein said chelating agent of said solution containing a chelating agent in step 6 is selected from the group consisting of diglycolic acid, carboxylic acid, hydroxy acid, EDTA, and combinations thereof.

15. A method in accordance with claim 9 wherein said chelating agent of said solution containing a chelating agent in step 6 is diglycolic acid.

16. A method in accordance with claim 9 wherein step 7 comprises precipitating said scandium from said elution solution comprising said scandium with ammonium hydroxide to form a scandium hydroxide precipitate.

17. A method of recovering scandium from an aqueous solution comprising scandium, iron, and manganese comprising the following steps:

Step 1 adding acid and a reducing agent to said aqueous solution comprising scandium, iron, and manganese to convert any tetravalent manganese to divalent manganese forming an acid solution comprising said scandium, iron, and divalent manganese;

Step 2 converting any trivalent iron present in said acid solution comprising said scandium, iron, and divalent manganese from step 1 to divalent iron by adding an iron reducing agent forming a trivalent iron free acid solution comprising said scandium, divalent iron, and divalent manganese;

Step 3 adjusting said trivalent iron free solution comprising said scandium, divalent iron, and divalent manganese from step 2 to a pH from about 1.9 to about 2.1 to form a pH adjusted solution comprising said scandium, divalent iron, and divalent manganese;

Step 4 removing said scandium contained in said pH adjusted solution comprising said scandium, divalent iron, and divalent manganese from step 3 by contacting said pH adjusted solution comprising said scandium, divalent iron, and divalent manganese with an ion exchange resin being in a hydrogen form and having an iminodiacetic acid functionality forming an ion exchange resin having said scandium absorbed thereon;

Step 5 rinsing said ion exchange resin having said scandium absorbed thereon from step 4 with a dilute acid having a pH from about 1.9 to about 2.1 to remove any base metals and rare earth metals absorbed on said ion exchange resin without removing said scandium absorbed thereon;

Step 6 eluting said scandium absorbed on said ion exchange resin with a solution comprising a chelating agent to form an elution solution comprising said scandium and said chelating agent;

Step 7 removing said scandium from said elution solution comprising said scandium and said chelating agent by contacting said elution solution comprising said scandium and said chelating agent with a strong cation ion exchange resin being in a hydrogen form to form a strong cation ion exchange resin having said scandium absorbed thereon;

Step 8 eluting said scandium absorbed on said strong cation exchange resin from step 7 with a strong acid to form a second acid solution comprising said scandium;

Step 9 precipitating said scandium from said second acid solution comprising said scandium by adding a precipitating agent to said second acid solution comprising said scandium to form a scandium precipitate in a second acid solution; and Step 10 separating said scandium precipitate from said strong acid solution.

18. A method in accordance with claim 17 wherein said acid solution comprising a reducing agent in step 1 comprises hydrazine in sulfuric acid.

19. A method in accordance with claim 17 wherein said trivalent iron free acid solution comprising said scandium, divalent iron, and divalent manganese in step 2 has a pH range from about 1.5 to about 1.7.

20. A method in accordance with claim 17 wherein said step 3 comprises adjusting said trivalent free iron acid solution comprising said scandium, divalent iron, and divalent manganese from step 2 with a base to a pH of about 2.0 to form a pH adjusted solution comprising said scandium, divalent iron, and divalent manganese.

21. A method in accordance with claim 17 wherein said dilute acid of step 5 comprises a solution having a pH of about 1.9 to about 2.1.

22. A method in accordance with claim 17 wherein said chelating agent of said solution containing a chelating agent in step 6 is selected from the group consisting of diglycolic acid, carboxylic acid, hydroxy acid, EDTA, and combinations thereof.

23. A method in accordance with claim 17 wherein said chelating agent of said solution containing a chelating agent in step 6 is diglycolic acid.

24. A method in accordance with claim 17 wherein said strong acid in step 8 is 6N HCl.

25. A method in accordance with claim 17 wherein step 7 comprises precipitating said scandium from said elution solution comprising said scandium with oxalic acid to form a scandium oxalate precipitate.

* * * * *